(12) United States Patent
Fujimoto et al.

(10) Patent No.: US 7,984,165 B2
(45) Date of Patent: Jul. 19, 2011

(54) DIGITAL MULTIFUNCTION DEVICE USING COMMUNICATION PROTOCOL WITH HIGHEST PRIORITY TO TRANSMIT DATA TO DESTINATION

(75) Inventors: Hideki Fujimoto, Ebina (JP); Kohshiro Inomata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 174 days.

(21) Appl. No.: 12/362,853

(22) Filed: Jan. 30, 2009

(65) Prior Publication Data
US 2010/0042737 A1 Feb. 18, 2010

(30) Foreign Application Priority Data
Aug. 13, 2008 (JP) .................... 2008-208625

(51) Int. Cl.
*G06F 15/16* (2006.01)
(52) U.S. Cl. .................. 709/228; 709/227; 709/230
(58) Field of Classification Search .......... 710/11; 358/448, 402, 1.15, 443; 709/227, 228, 230, 709/222, 224; 726/26
See application file for complete search history.

(56) References Cited

U.S. PATENT DOCUMENTS

| 2007/0002392 A1 * | 1/2007 | Ogura ......................... 358/448 |
| 2007/0089173 A1 * | 4/2007 | Hikichi et al. ................ 726/26 |
| 2008/0030774 A1 * | 2/2008 | Webster et al. ............ 358/1.15 |
| 2008/0151316 A1 * | 6/2008 | Yoshida ....................... 358/402 |
| 2009/0015877 A1 * | 1/2009 | Connors ...................... 358/443 |
| 2009/0063665 A1 * | 3/2009 | Bagepalli et al. ........... 709/222 |

FOREIGN PATENT DOCUMENTS

| JP | 2002-044341 A | 2/2002 |
| JP | 2006-011985 A | 1/2006 |

\* cited by examiner

*Primary Examiner* — Le Luu
(74) *Attorney, Agent, or Firm* — Sughrue Mion, PLLC

(57) ABSTRACT

A data transmission device includes: a sending unit that sends data according to one of a plurality of communication protocols; a data obtaining unit that obtains data; a communication address obtaining unit that obtains plural communication addresses assigned to a destination to which the obtained data is to be sent; a determining unit that determines a communication protocol to be used for sending the obtained data to the destination from among one or more communication protocols that are included in the plural communication protocols to which the sending unit is adapted, and that correspond to one of the obtained plural communication addresses; and a transmission control unit that causes the sending unit to send the obtained data according to the determined communication protocol to a communication address corresponding to the determined communication protocol, the communication address being included in the obtained plural communication addresses.

11 Claims, 8 Drawing Sheets

| | USER NAME | TARO FUJI |
|---|---|---|
| ATTRIBUTE DATA | TELEPHONE NUMBER | XXX-1234 |
| | EXTENSION NUMBER | 7-XXX-1111 |
| | FAX NUMBER | XXX-1200 |
| | EMAIL ADDRESS | - |
| | FTP ADDRESS | 129.249.198.xxx |
| | FTP LOGIN ID | Taro |
| | FTP LOGIN PASSWORD | ****** |
| | FTP STORAGE LOCATION | Scan |
| | SMB ADDRESS | ¥¥taro-fuji¥Scan |
| | SMB LOGIN ID | Fuji-taro |
| | SMB LOGIN PASS | ****** |
| | SMB STORAGE LOCATION | SHARED FOLDER |
| TRANSFER PROTOCOL | PRIORITY ORDER 1 | MAIL TRANSFER PROTOCOL |
| | PRIORITY ORDER 2 | FAX TRANSFER PROTOCOL |
| | PRIORITY ORDER 3 | SMB PROTOCOL |
| | PRIORITY ORDER 4 | FTP PROTOCOL |

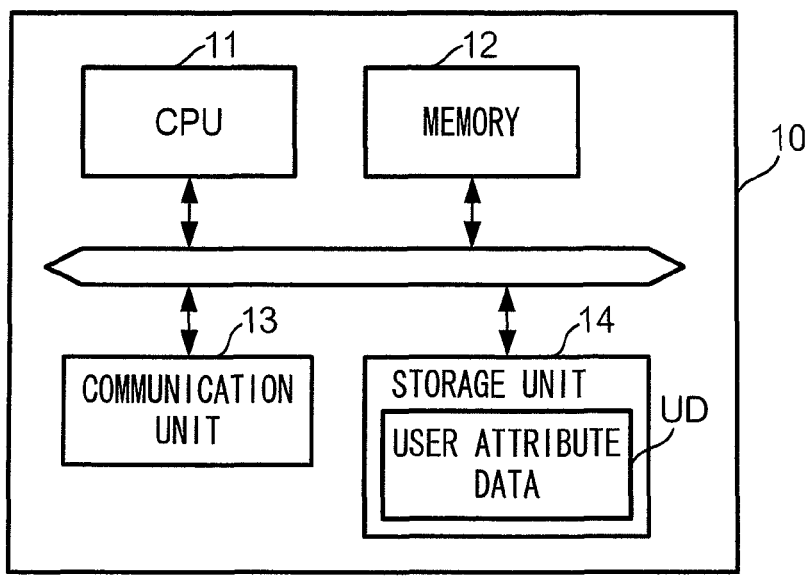

FIG. 3

| USER NAME | | TARO FUJI |
|---|---|---|
| ATTRIBUTE DATA | TELEPHONE NUMBER | XXX-1234 |
| | EXTENSION NUMBER | 7-XXX-1111 |
| | FAX NUMBER | XXX-1200 |
| | EMAIL ADDRESS | - |
| | FTP ADDRESS | 129.249.198.xxx |
| | FTP LOGIN ID | Taro |
| | FTP LOGIN PASSWORD | ****** |
| | FTP STORAGE LOCATION | Scan |
| | SMB ADDRESS | ¥¥taro-fuji¥Scan |
| | SMB LOGIN ID | Fuji-taro |
| | SMB LOGIN PASS | ****** |
| | SMB STORAGE LOCATION | SHARED FOLDER |
| TRANSFER PROTOCOL | PRIORITY ORDER 1 | MAIL TRANSFER PROTOCOL |
| | PRIORITY ORDER 2 | FAX TRANSFER PROTOCOL |
| | PRIORITY ORDER 3 | SMB PROTOCOL |
| | PRIORITY ORDER 4 | FTP PROTOCOL |

FIG. 5

| USER NAME | | HANAKO YAMADA |
|---|---|---|
| ATTRIBUTE DATA | TELEPHONE NUMBER | XXX-5678 |
| | EXTENSION NUMBER | 7-XXX-2222 |
| | FAX NUMBER | XXX-1200 |
| | EMAIL ADDRESS | Hanako.Yamada@aa.co.jp |
| | FTP ADDRESS | 129.249.198.xxx |
| | FTP LOGIN ID | hanako |
| | FTP LOGIN PASSWORD | ****** |
| | FTP STORAGE LOCATION | Scan |
| | SMB ADDRESS | ¥¥hanako-yamada¥Scan |
| | SMB LOGIN ID | Yamada-hanako |
| | SMB LOGIN PASS | ****** |
| | SMB STORAGE LOCATION | SHARED FOLDER |
| TRANSFER PROTOCOL | PRIORITY ORDER 1 | FTP PROTOCOL |
| | PRIORITY ORDER 2 | MAIL TRANSFER PROTOCOL |
| | PRIORITY ORDER 3 | FAX TRANSFER PROTOCOL |
| | PRIORITY ORDER 4 | SMB PROTOCOL |

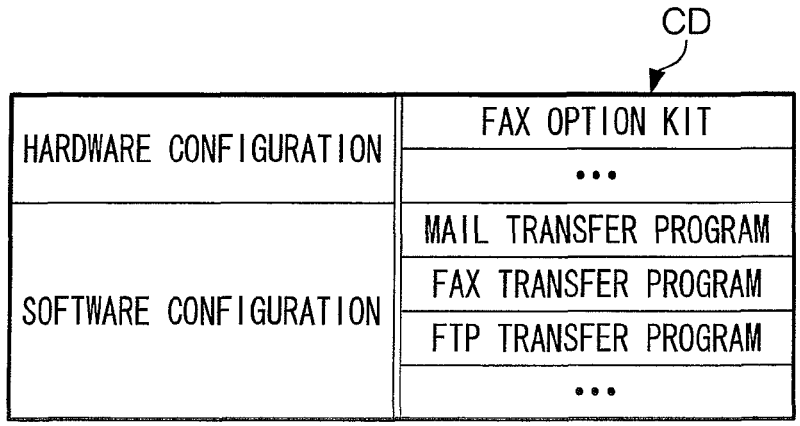

FIG. 7

| TRANSFER PROTOCOL | SELECTING CONDITION (SD) | |
|---|---|---|
| | CONFIGURATION SELECTING CONDITION | DATA SELECTING CONDITION |
| MAIL TRANSFER PROTOCOL | MAIL TRANSFER PROGRAM | EMAIL ADDRESS OF DESTINATION |
| FAX TRANSFER PROTOCOL | FAX TRANSFER PROGRAM | FAX NUMBER OF DESTINATION |
| | FAX OPTION KIT | |
| FTP PROTOCOL | FTP TRANSFER PROGRAM | FTP ADDRESS OF DESTINATION |
| | | LOGIN ID, LOGIN PASSWORD |
| | | FTP STORAGE LOCATION |
| SMB PROTOCOL | SMB TRANSFER PROGRAM | LOGIN ID, LOGIN PASSWORD |
| | | SMB STORAGE LOCATION |

DIGITAL MULTIFUNCTION DEVICE USING COMMUNICATION PROTOCOL WITH HIGHEST PRIORITY TO TRANSMIT DATA TO DESTINATION

CROSS-REFERENCE TO RELATED APPLICATIONS

This application is based on and claims priority under 35 USC 119 from Japanese Patent Application No. 2008-208625 filed on Aug. 13, 2008.

BACKGROUND

1. Technical Field

The present invention relates to a data transmission device, a read data transmission device, and a data transmission method.

2. Related Art

A technique for sending a scanned electronic image to a communication device is known.

SUMMARY

An aspect of the present invention provides a data transmission device including: a sending unit that sends data according to one of plural communication protocols; a data obtaining unit that obtains data to be sent by the sending unit; a communication address obtaining unit that obtains plural communication addresses assigned to a destination to which the data obtained by the data obtaining unit is to be sent; a determining unit that determines a communication protocol to be used for sending the data obtained by the data obtaining unit to the destination from among one or more communication protocols that are included in the plural communication protocols to which the sending unit is adapted, and that correspond to one of the plural communication addresses obtained by the communication address obtaining unit; and a transmission control unit that causes the sending unit to send the data obtained by the data obtaining unit according to the communication protocol determined by the determining unit to a communication address corresponding to the communication protocol determined by the determining unit, the communication address being included in the plural communication addresses obtained by the communication address obtaining unit.

BRIEF DESCRIPTION OF THE DRAWINGS

Exemplary embodiments of the present invention will now be described in detail below with reference to the following figures, wherein:

FIG. 2 is a block diagram illustrating a configuration of a server constituting the data transmission system;

FIG. 3 is a diagram illustrating an example of user attribute data stored in the server;

FIG. 5 is a diagram illustrating an example of address book data stored in the image forming device;

FIG. 6 is a diagram illustrating an example of configuration data stored in the image forming device;

FIG. 7 is a diagram illustrating an example of selection condition data stored in the image forming device;

DETAILED DESCRIPTION

Configuration

Figure 1:
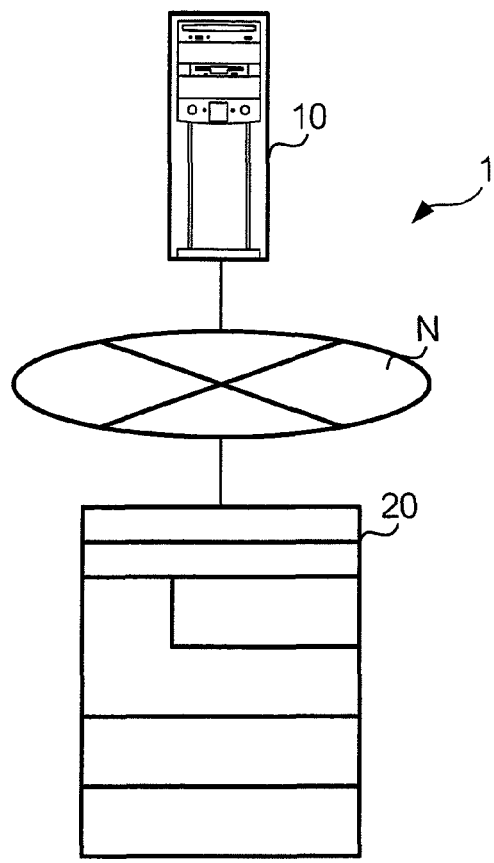
FIG. 1 is a diagram illustrating a configuration of a data transmission system according to an exemplary embodiment.

FIG. 1 is a diagram illustrating a configuration of data transmission system 1 according to an exemplary embodiment. As shown in the drawing, data transmission system 1 includes server 10 and image forming device 20. Server 10 and image forming device 20 are interconnected via communication line N. In the present exemplary embodiment, image forming device 20 is used as a data transmission device or a scanned data transmission device, and server 10 is used as an external device.

(Configuration of Server)

A configuration of server 10 will now be described. Server 10 has a directory service function. FIG. 2 is a block diagram illustrating a configuration of server 10. As shown in the drawing, server 10 includes CPU (Central Processing Unit) 11, memory 12, communication unit 13, and storage unit 14. CPU 11 executes a program stored in memory 12 or storage unit 14 to enable a particular operation. Memory 12 may include a ROM (Read Only Memory) and a RAM (Random Access Memory), which stores programs and data used by CPU 11. Communication unit 13 establishes communication with image forming device 20 connected with server 10 via communication line N, to exchange data. Storage unit 14 may be a hard disk, which stores user attribute data UD.

Now, user attribute data UD stored in storage unit 14 will be described. FIG. 3 is a diagram illustrating an example of user attribute data UD. As shown in the drawing, user attribute data UD includes "attribute data" and a "priority order of transfer protocol" which are associated with each "user name". "Attribute data" includes a "telephone number", an "extension number", a "fax number", an "email address", an "FTP address", an "FTP login ID", an "FTP login password", an "FTP storage location", an "SMB address", an "SMB login ID", an "SMB login password", and an "SMB storage location". A "fax number" is a number assigned to a fax machine used by a user. A "fax number" is used as a communication address for sending data to a user according to a fax transfer protocol. An "email address" is an email address used by a user. An "email address" is used as a communication address for sending data to a user according to a mail transfer protocol. An "FTP address", an "FTP login ID", an "FTP login password", and an "FTP storage location" are data used for sending data to a user according to an FTP protocol. An "FTP address" is used as a communication address for sending data to a user according to an FTP protocol. An "SMB address", an "SMB login ID", an "SMB login password", and an "SMB storage location" are data used for sending data to a user according to an SMB protocol. An "SMB address" is used as a communication address for sending data to a user according to an FTP protocol. A "priority order of transfer protocol" is a priority order of a transfer protocol which is used for sending data to a user.

In user attribute data UD shown in FIG. 3, a fax number "XXX-1200", an FTP address "129.249.198.xxx", and an SMB address ¥¥taro-fuji¥Scan are associated with a user name "Taro Fuji", which means that communication addresses of the fax number "XXX-1200", the FTP address "129.249.198.xxx", and the SMB address "¥¥taro-fuji¥Scan" are assigned to a user named "Taro Fuji". A hyphen set as an email address of the user named "Taro Fuji" in user attribute data UD is an indication that an email address is not set for a user named "Taro Fuji". Also, in user attribute data shown in FIG. 3, a "mail transfer protocol" is set as a first priority transfer protocol, a "FAX transfer protocol" is set as a second priority transfer protocol, an "SMB protocol" is set as a third priority transfer protocol, and an "FTP protocol" is set as a fourth priority transfer protocol, which means that the priority order of transfer protocols used for sending data to the user named "Taro Fuji" is as follows: a "mail transfer protocol", a "fax transfer protocol", an "SMB protocol", and an "FTP protocol".

(Configuration of Image Forming Device)

Figure 4:
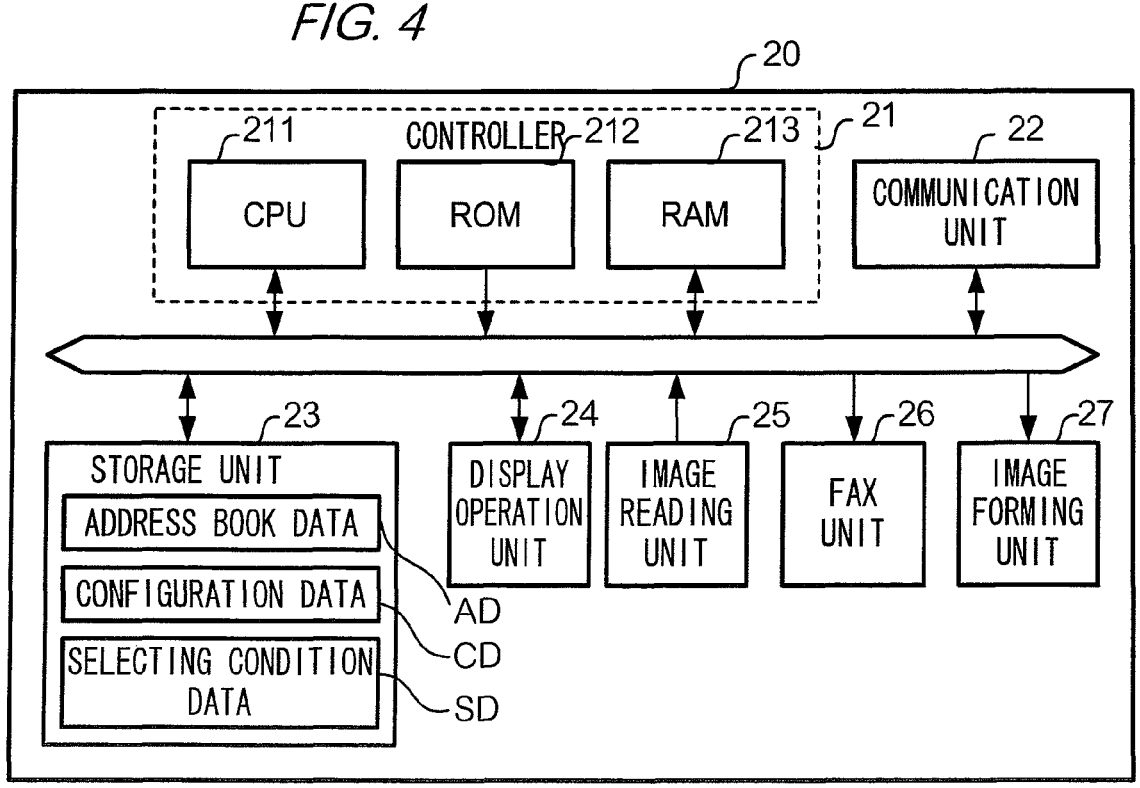
FIG. 4 is a block diagram illustrating a configuration of an image forming device constituting the data transmission system.

A configuration of image forming device 20 will be described. Image forming device 20 has plural functions such as a print function, a scan function, a copy function, and a fax function. FIG. 4 is a block diagram illustrating a configuration of image forming device 20. As shown in the drawing, image forming device 20 includes controller 21, communication unit 22, storage unit 23, display operation unit 24, image reading unit 25, fax unit 26, and image forming unit 27. Controller 21 includes CPU 211, ROM 212, and RAM 213. In the present exemplary embodiment, communication unit 22 and fax unit 26 are used as a transmission unit, CPU 211 is used as a data obtaining unit, a determining unit, a transmission control unit, and a priority order data obtaining unit, display operation unit 24 is used as a display unit, and image reading unit 25 is used as a reading unit.

CPU 211 executes a program stored in ROM 212 or storage unit 23 to control components of image forming device 20. ROM 212 stores programs such as a program necessary for starting up image forming device 20, and data. ROM 213 is used as a work area when CPU 211 executes a program. Communication unit 22 establishes communication with server 10 connected with image forming device 20 via communication line N or another communication device (not shown), to exchange data with the device. Communication unit 22 sends data according to a mail transfer protocol, an FTP protocol, or an SMB protocol. These protocols are communication protocols for use in sending data. Storage unit 23 may be a hard disk, which stores, in addition to programs executed by CPU 211, address book data AD, configuration data CD, and selecting condition data SD.

Display operation unit 24 may be a touch panel, which displays an image under control of CPU 211, and provides an operation signal corresponding to an input operation by a user to CPU 211. Image reading unit 25 may be a scanner, which reads an image of a document to output data of the image. Fax unit 26 establishes communication with a communication device (not shown) connected with image forming device 20 via a telephone network (not shown), to exchange data with the communication device. Fax unit 26 sends data according to a FAX transfer protocol. Image forming unit 27 may be a printer that forms an image in an electro-photographic method, which forms an image on the basis of image data output from image reading unit 25 or image data received by communication unit 22 or fax unit 26, on a sheet, and outputs the sheet.

Now, address book data AD stored in storage unit 23 will be described. FIG. 5 is a diagram illustrating an example of address book data AD. As shown in the drawing, address book data AD includes "attribute data" and a "priority order of transfer protocol" which are associated with each "user name" of a user of image forming device 20, as in the case of user attribute data UD. Address book data AD is configured in the same form as that of user attribute data UD. However, user data lacking in address book data AD may be included in user attribute data UD. Each data entry included in address book data AD is the same as that of user attribute data UD; accordingly, a description of those data will be omitted.

Now, configuration data CD stored in storage unit 23 will be described. FIG. 6 is a diagram illustrating an example of configuration data CD. As shown in the drawing, configuration data CD lists a "hardware configuration" and a "software configuration" which are provided in image forming device 20. For example, according to configuration data CD shown in FIG. 6, it is shown that image forming device 20 has a "FAX option kit" as a hardware configuration, and has a "mail transfer program", a "FAX transfer program", and an "FTP transfer program" as a software configuration. A "FAX option kit" refers to fax unit 26 discussed above. A "mail transfer program", a "FAX transfer program", and an "FTP transfer program" are application programs for realizing a function of sending data according to a mail transfer protocol, a FAX transfer protocol, or an FTP protocol, respectively. These programs are all stored in storage unit 23, and executed by CPU 211. Configuration data CD is updated each time a new device or a new program is added.

Now, selecting condition data SD stored in storage unit 23 will be described. FIG. 7 is a diagram illustrating an example of selecting condition data SD. As shown in the drawing, selecting condition data SD includes a "transfer protocol" and a "selecting condition" which are associated with each other. A "selecting condition" includes a "configuration selecting condition" and a "data selecting condition". A "configuration selecting condition" is a configuration of image forming device 20 which is necessary for sending data according to a transfer protocol. A "data selecting condition" is data necessary for sending data according to a transfer protocol. For example, in selecting condition data SD shown in FIG. 7, a "mail transfer protocol", a "mail transfer protocol", and an "email address of destination" are associated with each other, which means that to send data according to a "mail transfer protocol", image forming device 20 has to be provided with a "mail transfer program", and to obtain an "email address of destination".

[Operation]

Figure 8:
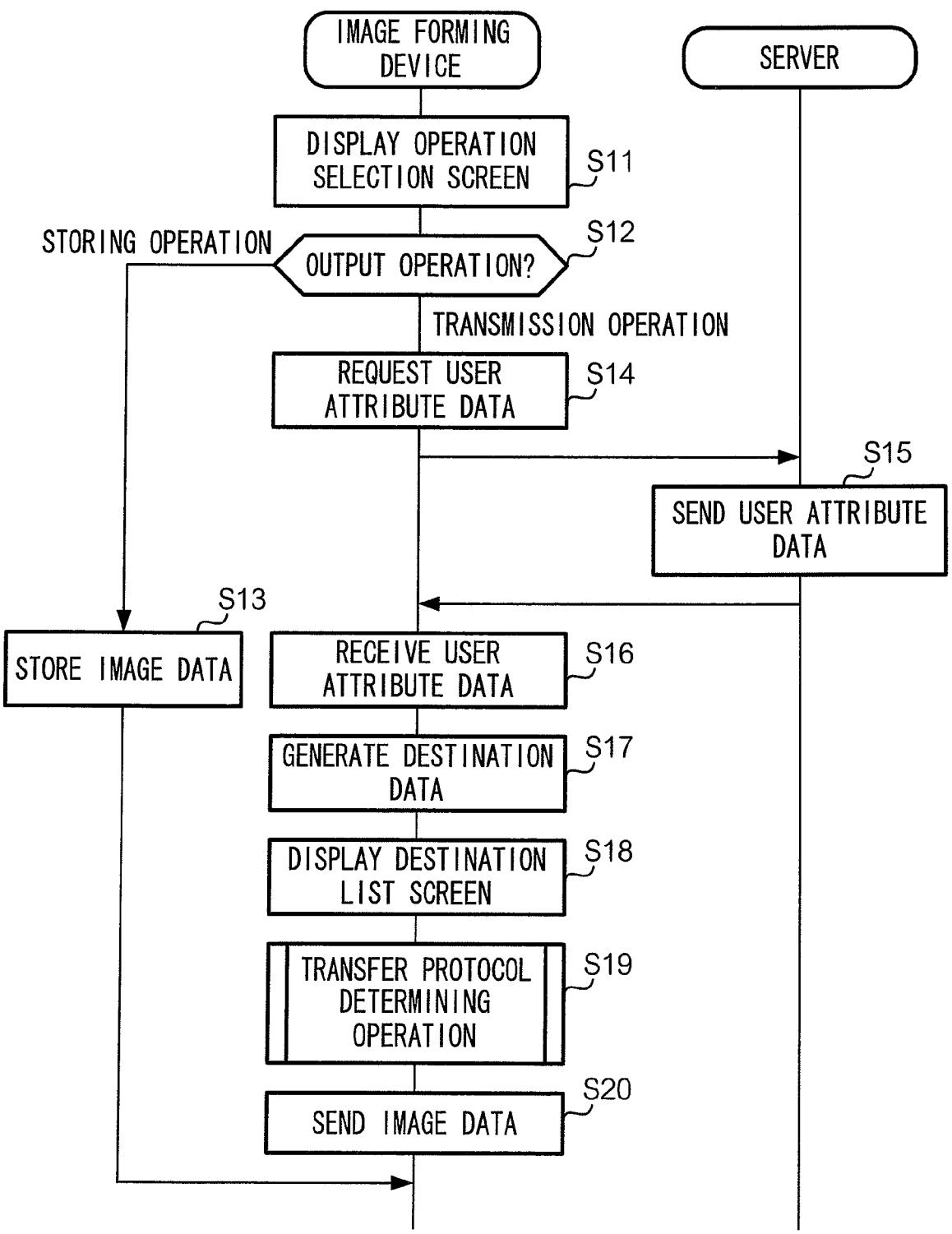
FIG. 8 is a sequence diagram illustrating a data transmission operation of the data transmission system.
Figure 9A:
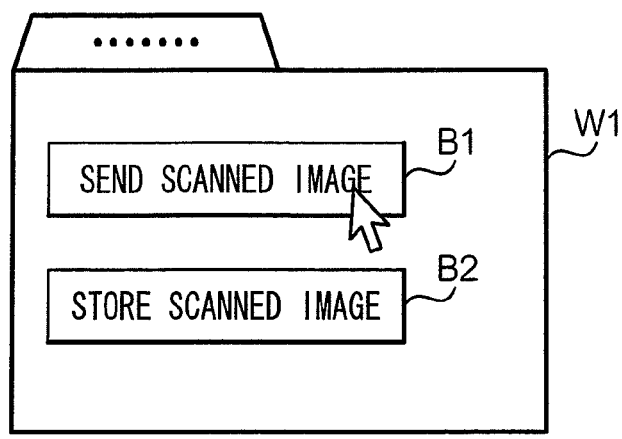
FIGS. 9A to 9D are diagrams illustrating an example of a screen displayed in the image forming device.

A data transmission operation of image forming device 20 will be described with reference to FIG. 8. FIG. 8 is a sequence diagram illustrating the data transmission operation. If an image of a document is read by image reading unit 20 to output data of the image, CPU 211 obtains the image data to store it in RAM 213, and causes display operation unit 24 to display operation selection screen W1 for receiving an instruction from a user to select an operation to be performed on the image data (step S11). FIG. 9A is a diagram illustrating an example of operation selection screen W1. Operation selection screen W1 is provided with operation selection button B1 with an indication "send scanned image", which is pressed if a user wishes to select an transmission operation of sending the image data to a communication device, and operation selection button B2 with an indication "store scanned image", which is pressed if a user wishes to select a storing operation of storing the image data in storage unit 23. If an instruction input by a user is received by display operation unit 24, CPU 211 determines an operation selected by a user (step S12). For example, if a user presses operation selection button B2 with an indication "store scanned image" on display operation unit 24, CPU 211 determines that a storing operation has been selected (step S12: Storing Operation). In this case, CPU 211 stores the image data stored in RAM 213, in storage unit 23 (step S13), and ends the data transmission operation.

Figure 10:
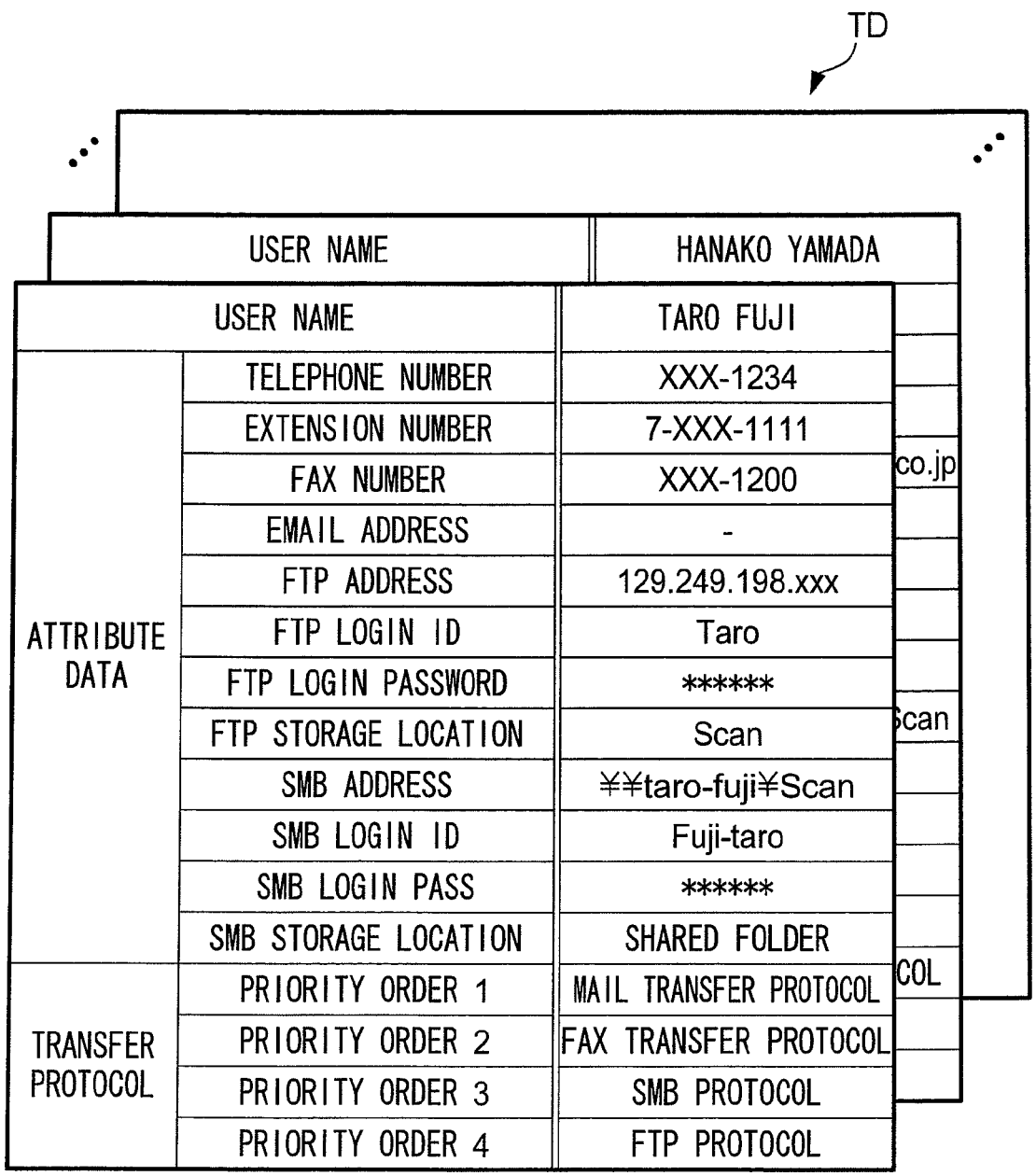
FIG. 10 is a diagram illustrating an example of destination data generated in the image forming device.

On the other hand, if a user presses operation selection button B1 with an indication "send scanned image" on display operation unit 24, CPU 211 determines that a transmission operation has been selected (step S12: Transmission Operation). In this case, CPU 211 requests user attribute data UD from server 10, using communication unit 22 (step S14). On receipt of the request from image forming device 20, CPU 11 of server 10 retrieves user attribute data UD from storage unit 14, and sends the data to image forming device 20, using communication unit 13 (step S15). In this example, it is assumed that user attribute data UD shown in FIG. 3 is sent to image forming device 20. If user attribute data UD is sent from server 10, CPU 211 of image forming device 20 causes communication unit 23 to receive the data (step S16). After user attribute data UD is received, CPU 211 combines the data and address book data AD stored in storage unit 23 to generate destination data TD, and stores it in RAM 213 (step S17). Destination data TD is data including a communication address of a user to be specified as a destination of the image data stored in RAM 213 and a priority order of a transfer protocol. In other words, CPU 211 obtains data on plural communication addresses assigned to a destination of obtained data from server 10 connected to image forming device 20 via communication line N, and obtains data on the priority order of transfer protocols that can be used for sending data to the destination from storage unit 23. FIG. 10 is a diagram illustrating an example of destination data TD. As shown in the drawing, destination data TD includes user attribute data shown in FIG. 3 and address book data shown in FIG. 5. If data relating to an identical user is included in both user attribute data UD and address book data AD, these data will be integrated.

Figure 9B:
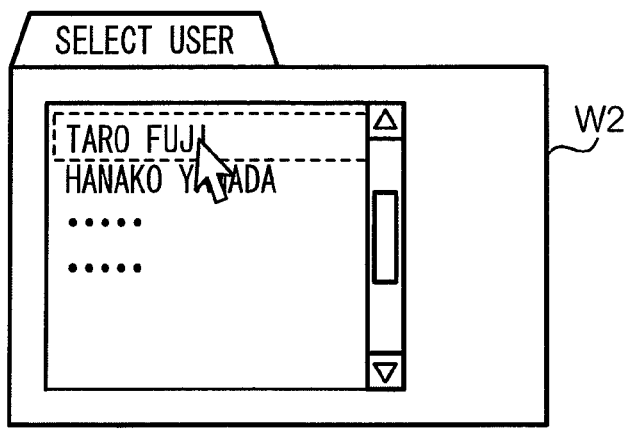

After destination data TD is stored in RAM 213, CPU 213 generates data on destination list screen W2 on the basis of destination data TD stored in RAM 213, and causes display operation unit 24 to display destination list screen W2 (step S18). FIG. 9B is a diagram illustrating an example of destination list screen W2. Destination list screen W2 lists user names included in destination data TD so that they are selectable by a user. A user operates display operation unit 24 to select a user as a destination of the image data. In this example, it is assumed that display operation unit 24 is operated by a user to select a user named "Taro Fuji" to be a destination of the image data. In this case, CPU 211 carries out a transfer protocol determining operation of determining a transfer protocol for use in sending data to a user named "Taro Fuji" on the basis of destination data TD stored in RAM 213 and configuration data CD and selecting condition data SD stored in storage unit 23 (step S19). After a transfer protocol is determined, CPU 211 retrieves a communication address corresponding to the transfer protocol from destination data TD stored in RAM 213. Subsequently, CPU 211 causes communication unit 22 or fax unit 26 to send the image data stored in RAM 213 according to the determined transfer protocol to the retrieved communication address (step S20). In other words, CPU 211 causes communication unit 22 or fax unit 26 to send obtained data according to a determined transfer protocol to a communication address assigned to a destination corresponding to the transfer protocol.

Figure 11:
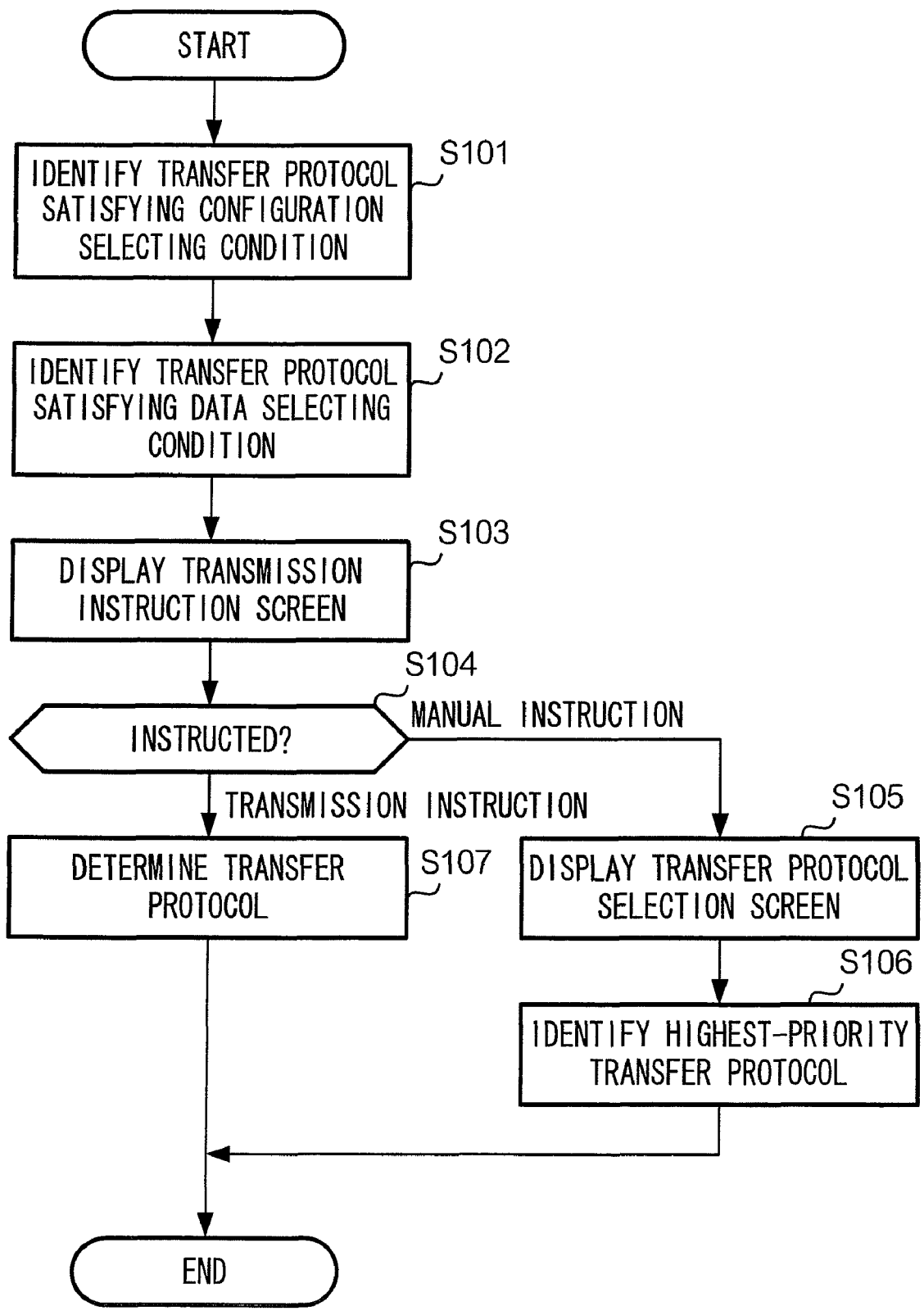
FIG. 11 is a flow diagram illustrating a transfer protocol determining operation of the image forming device.

Now, the transfer protocol determining operation discussed above will be described in detail with reference to FIG. 11. FIG. 11 is a flow diagram illustrating the transfer protocol determining operation. CPU 211 specifies a transfer protocol meeting a configuration selecting condition on the basis of selecting condition data SD and configuration data CD stored in storage unit 23 (step S101). The transfer protocol meeting a configuration selecting condition is a transfer protocol according to which communication unit 22 or fax unit 26 sends data. For example, according to selecting condition data SD shown in FIG. 7, "mail transfer program" is set as a configuration selecting condition corresponding to a "mail transfer protocol", and according to FIG. 6, a "mail transfer program" is included in configuration data CD; accordingly, a "mail transfer protocol" is specified as a transfer protocol meeting a configuration selecting condition. For the same reason, a "FAX transfer protocol" and an "FTP protocol" are specified as a transfer protocol meeting a configuration selecting condition. An "SMB protocol" is not specified because an "SMB transfer program" is not included in configuration data CD shown in FIG. 6.

After a transfer protocol meeting a configuration selecting condition is specified, CPU 211 specifies a transfer protocol meeting a data selecting condition on the basis of selecting condition data SD stored in storage unit 23 and destination data TD stored in RAM 213 (step S102). A transfer protocol meeting a data selecting condition is a transfer protocol corresponding to an obtained communication address of a destination. For example, according to selecting condition data SD shown in FIG. 7, a "fax number of destination" is set as a data selecting condition corresponding to a "FAX transfer protocol", and according to FIG. 10, a "fax number" of "Taro Fuji" who is a destination is included in destination data TD; accordingly, a "FAX transfer protocol" is specified as a transfer protocol meeting a data selecting condition. For the same reason, an "FTP protocol" and an "SMB protocol" are specified as a transfer protocol meeting a data selecting condition. A "mail transfer protocol" is not specified because an "email address" of "Taro Fuji" who is a destination is not set in destination data TD.

Figure 9C:
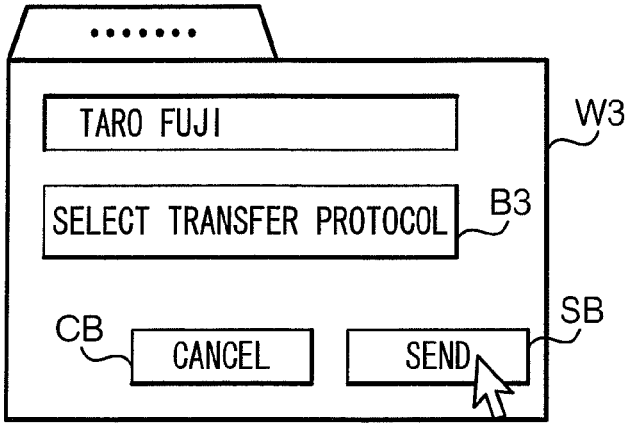

After a transfer protocol meeting a configuration selecting condition is specified, CPU 211 causes display operation unit 24 to display transmission instruction screen W3 (step S103). FIG. 9C is a diagram illustrating an example of transmission instruction screen W3. As shown in the drawing, transmission instruction screen W3 shows a user name of a destination, "Taro Fuji", transmission instruction button B3 for instructing the transmission of image data, cancel button CB for cancelling the transmission of image data, and manual selection button B3 with an indication of "select transfer protocol" for manually setting a transfer protocol. If display operation unit 24 receives an instruction from a user, CPU 211 determines the received instruction (step S104).

Figure 9D:
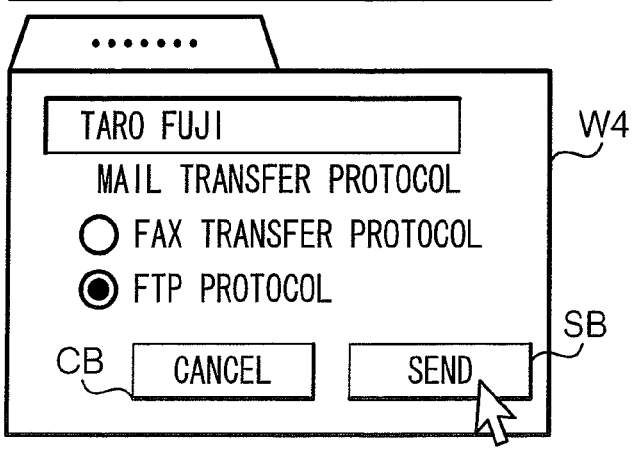

For example, if a user presses manual selection button B3 (step S104: Manual Instruction) on display operation unit 24, CPU 211 generates data on transfer protocol selection screen W4 on the basis of the transfer protocol meeting a configuration selecting condition specified at step S101 and a priority order of a transfer protocol included in destination data TD stored in RAM 213, and causes display operation unit 24 to display transfer protocol selection screen W4 (step S105). FIG. 9D is a diagram illustrating an example of transfer protocol selection screen W4. As shown in the drawing, transfer protocol selection screen W4 shows a user name of a destination, "Taro Fuji", transmission instruction button SB and cancel button CB discussed above, and a list of transfer protocols that includes the names of the transfer protocols meeting a configuration selecting condition specified at step S101, in order of descending priority. In this example, since a mail transfer protocol, a FAX transfer protocol, and an FTP protocol are specified at step S101, and according to destination data TD shown in FIG. 10, a mail transfer protocol is set as a first priority transfer protocol, a FAX transfer protocol is set as a second priority transfer protocol, and an FTP protocol is set as a fourth priority transfer protocol, the order of the names of the transfer protocols is as follows: a mail transfer protocol, a FAX transfer protocol, and an FTP protocol. Among the transfer protocols, a FAX transfer protocol and an FTP protocol are displayed as being selectable; whereas, a mail transfer protocol is displayed as being not selectable, because a FAX transfer protocol and an FTP protocol are specified at both steps S101 and S102; and whereas, a mail transfer protocol is not specified at step S102. In other words, a FAX transfer protocol and an FTP protocol meet both a configuration selecting condition and a data selecting condition; whereas, a mail transfer protocol meets a configuration selecting condition, but does not meet a data selecting condition. That is, CPU 211 causes display operation unit 24 to display a list of transfer protocols to which communication unit 22 or fax unit 26 is adapted, and that correspond to a communication address assigned to a destination which has been obtained, and among the transfer protocol, a transfer protocol whose corresponding communication address of a destination has not been obtained is displayed as being not selectable. The reason that a mail transfer protocol that is not selectable is displayed is to inform a user that if data necessary for using a mail transfer protocol (in this example, an email address of a user named "Taro Fuji") is set, a mail transfer protocol becomes selectable.

If a user selects an FTP protocol and presses transmission instruction button SB on display operation unit 24, CPU 211 determines the selected FTP protocol to be a transfer protocol used for sending the image data to a user named "Taro Fuji" (step S106), and ends the transmission protocol determining operation. When an FTP protocol is selected, CPU 211 retrieves from destination data TD shown in FIG. 10, data relating to a user named "Taro Fuji" corresponding to an FTP protocol such as an FTP address, "129.249.198.xxx", an FTP login ID, "Taro", an FTP login password, "****", and an FTP storage location, "Scan". After the data is retrieved, CPU 211 causes communication unit 22 to send the image data stored in RAM 213 according to an FTP protocol to the FTP address of "129.249.198.xxx". The FTP login ID, "Taro", the FTP login password, "****" and the FTP storage location, "Scan", are used when the image data is sent.

On the other hand, if a user presses transmission instruction button SB (step S104: Transmission Instruction) on display operation unit 24, CPU 211 specifies a transfer protocol with the highest priority among transfer protocols specified at both steps S101 and S102 on the basis of destination data TD stored in RAM 213 (step S107). CPU 211 determines the specified transfer protocol to be a transfer protocol used for sending the image data to a user named "Taro Fuji" (step S107), and ends the transfer protocol determining operation. In other words, CPU 211 determines a transfer protocol to which communication unit 22 or fax unit 26 is adapted, that corresponds to a communication address assigned to a destination which has been obtained, and that has the highest priority, to be a transfer protocol used for sending data to a destination. In this example, since a FAX transfer protocol and an FTP protocol are specified at both steps S101 and S102, and according to destination data TD shown in FIG. 10, a FAX transfer protocol is set as a second priority transfer protocol, and an FTP protocol is set as a fourth priority transfer protocol, a FAX transfer protocol is determined as a transfer protocol used for sending the image data. In this case, at step S20 of FIG. 8, CPU 211 retrieves a fax number, "XXX-1200", of a user named "Taro Fuji" corresponding to a FAX transfer protocol from destination data TD shown in FIG. 10. After the fax number is retrieved, CPU 211 causes fax unit 26 to send the image data stored in RAM 213 according to a FAX transfer protocol using the fax number "XXX-1200".

[Modifications]

The above exemplary embodiment may be modified as described below. The following modifications may be combined with each other.

(Modification 1)

In the above exemplary embodiment, CPU 211 may identify a transfer protocol that is not suitable for sending data to a destination on the basis of a history of data transmission to the destination or the condition of a transmission path via which data is sent to a communication address assigned to the destination, and exclude the transfer protocol from transfer protocols used for sending data to the destination. For example, if a history of data transmission to a destination includes a case in which data sent according to a mail transfer protocol is not successfully received, CPU 211 may exclude a mail transfer protocol from transfer protocols used for sending data to the destination. Alternatively, CPU 211 may check the condition of transmission paths that can be used for sending data to a communication address assigned a destination, and if congestion occurs on a transmission path, CPU 211 may exclude a transfer protocol using the transmission path from transfer protocols used for sending data to the destination.

The excluded transfer protocol does not have to be displayed on transmission protocol selection screen W4 discussed above. Alternatively, the excluded transfer protocol may be displayed on transmission protocol selection screen W4 in such a form that the transfer protocol cannot be selected.

(Modification 2)

In the above exemplary embodiment, CPU 211 may, if operation selection button B2 with an indication of "store scanned data" is pressed, send the image data stored in RAM 213 to storage unit 23 according to an FTP protocol, to store the data in storage unit 23. In other words, CPU 211, if an instruction to send obtained data to a destination is provided, specifies a transfer protocol corresponding to the destination, and sends the data according to the transfer protocol.

(Modification 3)

In the above exemplary embodiment, the priority order of transfer protocols may be determined on the basis of a transmission history of image data. For example, a transfer protocol that is frequently used for sending image data to a destination may be given a higher priority.

Alternatively, the priority order of a transfer protocol that has been determined not to be suitable for sending data to a destination, as described in modification 1, may be lowered.

Alternatively, the priority order of transfer protocols may be updated by an operator of server 10 or image forming device 20 or a user of image forming device 20.

(Modification 4)

In the above exemplary embodiment, user attribute data UD and address book data AD have identical items. However, user attribute data UD may include a "user name", a "telephone number", an "extension number", a "fax number", and an "email address", and address book data AD may include a "user name" and data other than a "telephone number", an "extension number", a "fax number", and an "email address".

(Modification 5)

In the above exemplary embodiment, where user attribute data UD is obtained from server 10, the operation discussed above may be carried out using only address book data AD stored in storage unit 23. Alternatively, without storing address book data AD in storage unit 23, the operation discussed above may be carried out by using only user attribute data UD obtained from server 10.

(Modification 6)

In the above exemplary embodiment, where image data output from image reading unit 25 is sent to a destination, image data sent from a communication device and once stored in storage unit 23 may be sent to a destination.

(Modification 7)

The operations carried out by CPU 211 in the above exemplary embodiment may be carried out in cooperation with another piece of hardware, or by one or more pieces of hardware other than CPU 211.

Each program executed by CPU 211 may be provided via a computer-readable recording medium such as a magnetic recording medium such as a magnetic tape or a magnetic disk, an optical recording medium such as an optical disk, a magneto optical recording medium, or a semiconductor memory. Alternatively, each program may be downloaded via a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data transmission device comprising:
    a processor;
    a sending unit that sends data according to one of a plurality of communication protocols;
    a data obtaining unit that obtains data to be sent by the sending unit;
    a communication address obtaining unit that, when executed on the processor, obtains a plurality of communication addresses assigned to a destination to which the data obtained by the data obtaining unit is to be sent;
    a determining unit that determines a communication protocol to be used for sending the data obtained by the data obtaining unit to the destination from among one or more communication protocols that are included in the plurality of communication protocols to which the sending unit is adapted, and that correspond to one of the plurality of communication addresses obtained by the communication address obtaining unit;
    a transmission control unit that causes the sending unit to send the data obtained by the data obtaining unit according to the communication protocol determined by the determining unit to a communication address corresponding to the communication protocol determined by the determining unit, the communication address being included in the plurality of communication addresses obtained by the communication address obtaining unit; and
    a priority order data obtaining unit that obtains data on a priority order of the plurality of communication protocols to which the sending unit is adapted, wherein the determining unit determines a communication protocol with a highest priority to be a communication protocol to be used for sending the data obtained by the data obtaining unit to the destination, on the basis of the data on a priority of the plurality of communication protocols obtained by the priority order data obtaining unit, from among one or more communication protocols that are included in the plurality of communication protocols to which the sending unit is adapted, and that correspond to one of the plurality of communication addresses obtained by the communication address obtaining unit.

2. The data transmission device according to claim 1, wherein the determining unit determines, in response to an instruction to send the data obtained by the data obtaining unit to the destination, a communication protocol to be used for sending the data to the destination from among one or more communication protocols that are included in the plurality of communication protocols to which the sending unit is adapted, and that correspond to one of the plurality of communication addresses obtained by the communication address obtaining unit.

3. The data transmission device according to claim 1, wherein the communication address obtaining unit obtains the plurality of communication addresses from an external device connected to the data transmission device via a communication line.

4. The data transmission device according to claim 1, wherein the determining unit causes a display unit to display a list of one or more communication protocols that are included in the plurality of communication protocols to which the sending unit is adapted, and that correspond to one of the plurality of communication addresses obtained by the communication address obtaining unit, and determines a communication protocol selected from the list to be a communication protocol to be used for sending the data obtained by the data obtaining unit to the destination.

5. The data transmission device according to claim 4, further comprising a priority order data obtaining unit that obtains data on a priority order of the plurality of communication protocols to which the sending unit is adapted, wherein the determining unit causes the display unit to display the list of one or more communication protocols, in which the one or more communication protocols are arranged in order of descending priority on the basis of the data on a priority order of the plurality of communication protocols obtained by the priority order data obtaining unit.

6. The data transmission device according to claim 4, wherein the determining unit causes the display unit to display the list of one or more communication protocols so that a communication protocol whose corresponding communication address has not been obtained by the communication address obtaining unit is not selectable.

7. The data transmission device according to claim 4, wherein the determining unit further identifies a communication protocol that is not suitable for sending the data to the destination on the basis of a history of data transmission to the destination or a condition of transmission paths via which the data is to be sent to the plurality of communication addresses obtained by the communication address obtaining unit, and excludes the communication protocol from the list of one or more communication protocols, or causes the display unit to display the list of one or more communication protocols so that the communication protocol is not selectable.

8. A data transmission device comprising:
    a processor;
    a sending unit that sends data according to one of a plurality of communication protocols;
    a data obtaining unit that obtains data to be sent by the sending unit;

a communication address obtaining unit that, when executed on the processor, obtains a plurality of communication addresses assigned to a destination to which the data obtained by the data obtaining unit is to be sent;

a determining unit that determines a communication protocol to be used for sending the data obtained by the data obtaining unit to the destination from among one or more communication protocols that are included in the plurality of communication protocols to which the sending unit is adapted, and that correspond to one of the plurality of communication addresses obtained by the communication address obtaining unit; and a transmission control unit that causes the sending unit to send the data obtained by the data obtaining unit according to the communication protocol determined by the determining unit to a communication address corresponding to the communication protocol determined by the determining unit, the communication address being included in the plurality of communication addresses obtained by the communication address obtaining unit, wherein the determining unit further identifies a communication protocol that is not suitable for sending the data to the destination on the basis of a history of data transmission to the destination, and excludes the communication protocol from the one or more communication protocols that are included in the plurality of communication protocols to which the sending unit is adapted, and that correspond to one of the plurality of communication addresses obtained by the communication address obtaining unit.

9. A read data transmission device, comprising:

a processor, a reading unit that reads an image to output data on the image;

a sending unit that sends data according to one of a plurality of communication protocols;

a data obtaining unit that obtains the data output from the reading unit;

a communication address obtaining unit that, when executed on the processor, obtains a plurality of communication addresses assigned to a destination to which the data obtained by the data obtaining unit is to be sent;

a determining unit that determines a communication protocol to be used for sending the data obtained by the data obtaining unit to the destination from among one or more communication protocols that are included in the plurality of communication protocols to which the sending unit is adapted, and that correspond to one of the plurality of communication addresses obtained by the communication address obtaining unit;

a transmission control unit that causes the sending unit to send the data obtained by the data obtaining unit according to the communication protocol determined by the determining unit to a communication address corresponding to the communication protocol determined by the determining unit, the communication address being included in the plurality of communication addresses obtained by the communication address obtaining unit; and a priority order data obtaining unit that obtains data on a priority order of the plurality of communication protocols to which the sending unit is adapted, wherein the determining unit determines a communication protocol with a highest priority to be a communication protocol to be used for sending the data obtained by the data obtaining unit to the destination, on the basis of the data on a priority of the plurality of communication protocols obtained by the priority order data obtaining unit, from among one or more communication protocols that are included in the plurality of communication protocols to which the sending unit is adapted, and that correspond to one of the plurality of communication addresses obtained by the communication address obtaining unit.

10. A data transmission method comprising:

sending data according to one of a plurality of communication protocols;

obtaining data to be sent;

obtaining, using a processor, a plurality of communication addresses assigned to a destination to which the obtained data is to be sent;

determining a communication protocol to be used for sending the obtained data to the destination from among one or more communication protocols that are included in the plurality of communication protocols, and that correspond to one of the obtained plurality of communication addresses;

sending the obtained data according to the determined communication protocol to a communication address corresponding to the determined communication protocol, the communication address being included in the obtained plurality of communication addresses; and obtaining data on a priority order of the plurality of communication protocols, wherein the determining comprises determining a communication protocol with a highest priority to be a communication protocol to be used for sending the obtained data to the destination on the basis of the obtained data on a priority of the plurality of communication protocols, from among one or more communication protocols that are included in the plurality of communication protocols and that correspond to one of the obtained plurality of communication addresses.

11. A data transmission method comprising:

sending data according to one of a plurality of communication protocols;

obtaining data to be sent;

obtaining, using a processor, a plurality of communication addresses assigned to a destination to which the obtained data is to be sent;

determining a communication protocol to be used for sending the obtained data to the destination from among one or more communication protocols that are included in the plurality of communication protocols, and that correspond to one of the obtained plurality of communication addresses; and sending the obtained data according to the determined communication protocol to a communication address corresponding to the determined communication protocol, the communication address being included in the obtained plurality of communication addresses, wherein the determining further comprises identifying a communication protocol that is not suitable for sending the data to the destination on the basis of a history of data transmission to the destination, and excluding the communication protocol from the one or more communication protocols adapted for the sending, and that correspond to one of the obtained plurality of communication addresses.

* * * * *